Figure 1:
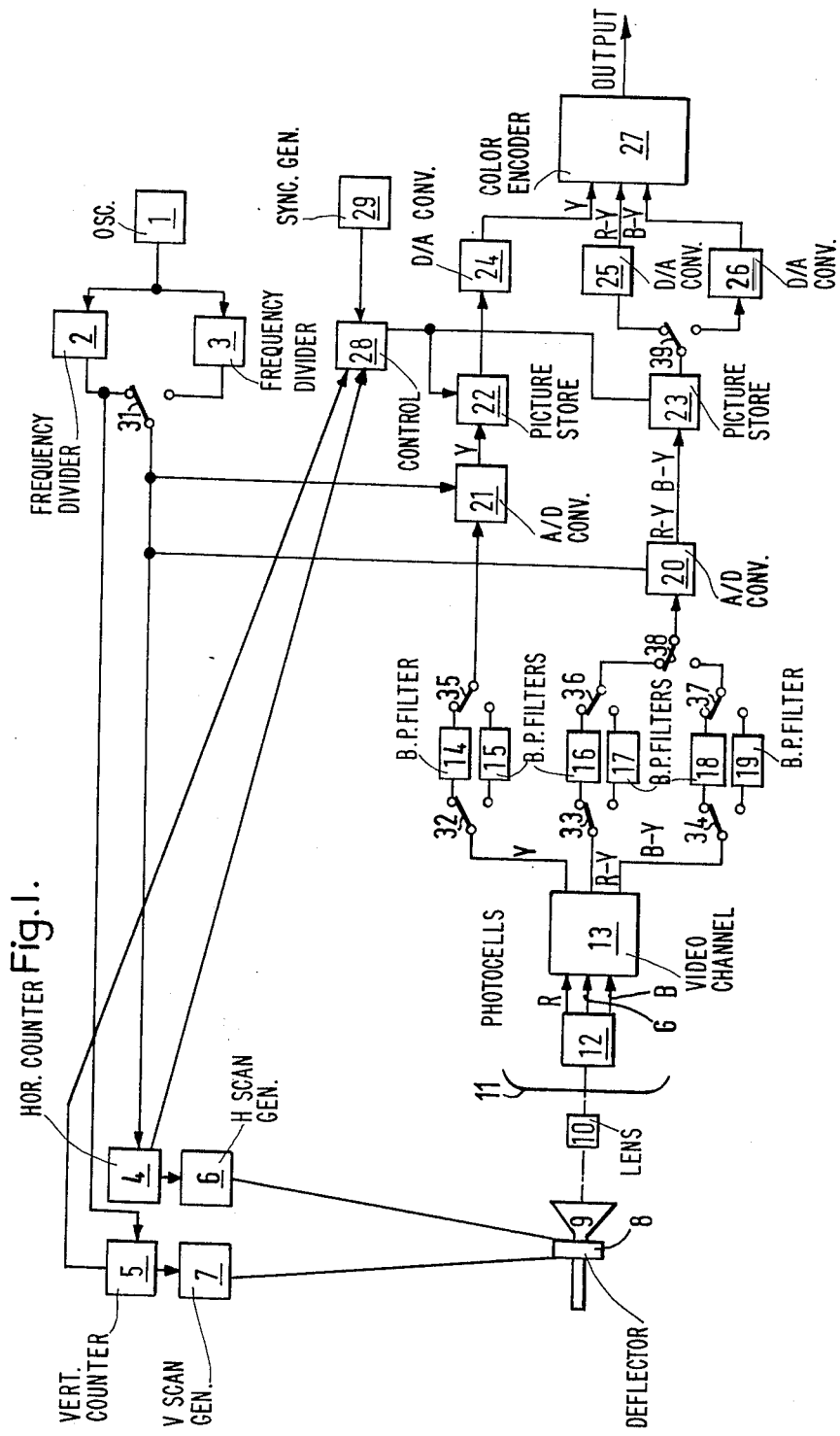

United States Patent [19]

Millward

[11] 4,268,865
[45] May 19, 1981

[54] CONTINUOUS MOTION FLYING SPOT TELECINE

[75] Inventor: John D. Millward, Hitchin, England

[73] Assignee: The Rank Organisation Limited, London, England

[21] Appl. No.: 86,711

[22] Filed: Oct. 22, 1979

[30] Foreign Application Priority Data

Oct. 20, 1978 [GB] United Kingdom ............... 41416/78

[51] Int. Cl.³ .............................................. H04N 3/36
[52] U.S. Cl. .................................................. 358/216
[58] Field of Search ........................ 358/214, 215, 216

[56] References Cited

U.S. PATENT DOCUMENTS 4,127,869  11/1978  Millward ........................ 358/214 X Primary Examiner—Robert L. Richardson
Attorney, Agent, or Firm—Brisebois & Kruger

[57] ABSTRACT

This invention concerns a continuous motion flying spot telecine apparatus of the kind comprising a cathode ray tube for effecting flying spot line-by-line scanning of each frame of a film during its motion through a scanning station, opto-electronic converter means for producing from the scanning of each film frame an analogue signal comprising a plurality of lines of which at least a part of each (the active part) contains picture information, an analogue-to-digital converter for sampling the analogue signal at a predetermined clock frequency, a filter for limiting the bandwidth of the analogue signal prior to sampling to avoid interference between the clock frequency and high frequencies in the analogue signal, a store for storing digital signals produced by the sampling, and means for reading out the stored digital signals in a predetermined sequence and at a predetermined rate.

In order to permit scanning of different format films or only part of the film frame height without burning the c.r.t., the apparatus further comprises means for selectively changing the line frequency of scanning between at least two values. In order to avoid changing the clock frequency when changing the line frequency, which would necessitate the use of switchable filters, means are provided for controlling the horizontal deflection speed of the flying spot in such manner that for either line scanning frequency the time taken to derive the active part of each line of the analogue signal corresponds to the same number of clock signals in each case. Preferably the last mentioned means comprises means for changing the horizontal scan amplitude of the flying spot in inverse proportion to the change in line scanning frequency.

6 Claims, 2 Drawing Figures

CONTINUOUS MOTION FLYING SPOT TELECINE

This invention relates to a continuous motion flying spot telecine apparatus.

When a flying spot tube is used to scan continuously moving film in a sequential manner to avoid field to field registration errors, the horizontal scan frequency may be increased above normal to avoid burning the tube, see our GB Patent No. 1535563.

When scanning certain cinemascope films or if only part of the film frame height is scanned to magnify that part such that a reduced vertical height is required, then the scan height may fall sufficiently to cause burning once more. The simple solution is to operate the horizontal scan generator at normal frequency in these circumstances, and in fact having two horizontal operating speeds allows an almost infinite range of vertical scan amplitude without the risk of burning.

To convert the sequential signal to interlaced as required by the television receiver a picture store is required and in practice this involves clocking or sampling the video signal. When the video signal is clocked or sampled the size of the store is proportional to the clocking frequency and therefore it is advantageous to keep the clocking frequency as low as possible. To prevent unwanted high frequencies in the video signal beating and causing interference with the clock frequency, the video signal is band limited with a filter. Normally, if two or more horizontal scan frequencies are used, two or more clock frequencies are required to retain the same number of samples per television line and keep a constant store size. Changing the clock frequency means changing the bandlimiting filters and the purpose of this invention is to avoid changing the band limiting filters whilst retaining a constant store size.

Accordingly, the present invention provides a continuous motion flying spot telecine apparatus, comprising means for transporting a film frame-by-frame with continuous motion past a scanning station, means for effecting flying spot line-by-line scanning of each film frame during its motion through the scanning station, opto-electronic converter and signal processing means for producing from the scanning of each film frame an analogue signal comprising a plurality of lines of which at least a part of each (the active part) contains picture information, filter means for limiting the bandwidth of the analogue signal, and analogue-to-digital converter for sampling the analogue signal at a predetermined clock frequency, a store for storing digital signals produced by the sampling, and means for reading out the stored digital signals in a predetermined sequence and at a predetermined rate, the apparatus further comprising means for selectively changing the line frequency of scanning between at least two values without changing the clock frequency, and means for controlling the horizontal deflection speed of the flying spot in such manner that for either line scanning frequency the time taken to derive the active part of each line of the analogue signal corresponds to the same number of clock signals in each case.

Preferably, the means for controlling the horizontal deflection speed of the flying spot comprises means for changing the horizontal scan amplitude of the flying spot in inverse proportion to the change in line scanning frequency.

Figure 2:
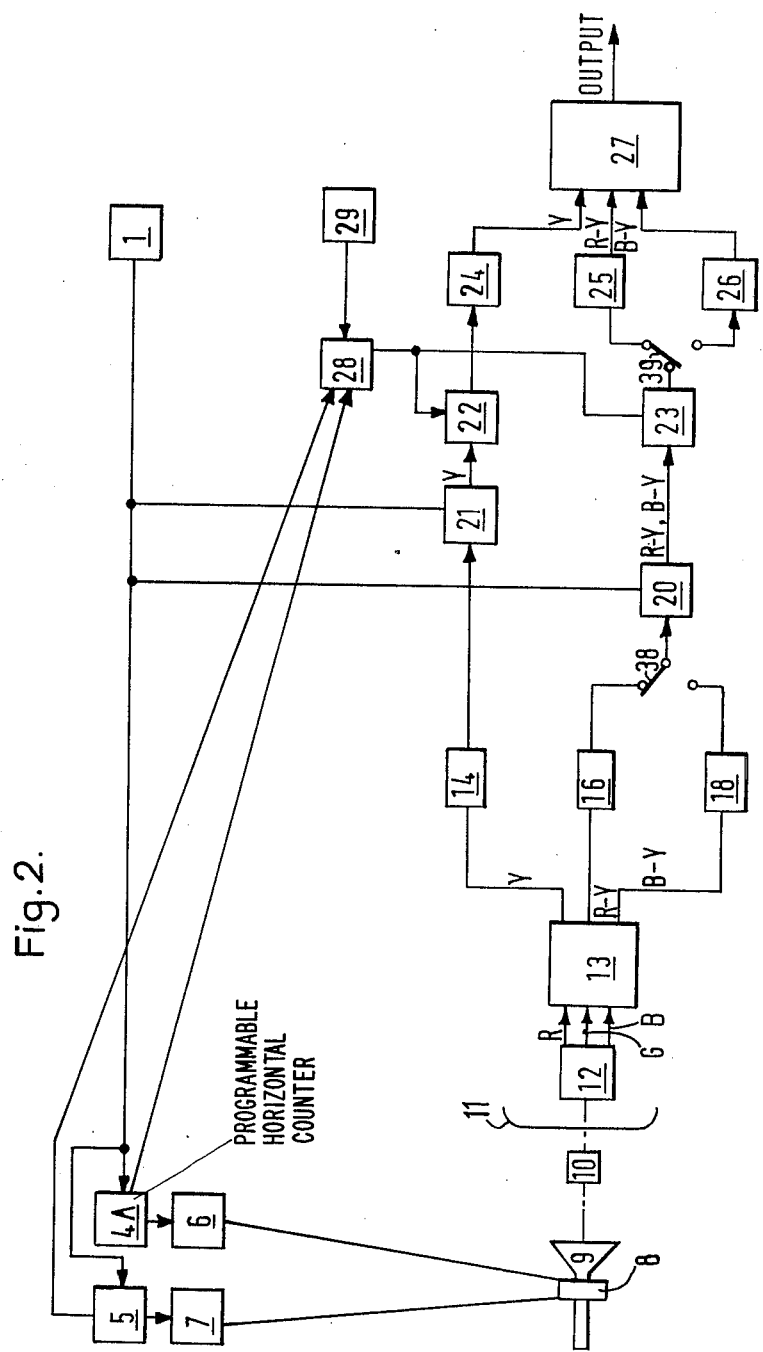

An embodiment of the invention will now be described, by way of example, with reference to the accompanying drawings, in which:

FIG. 1 is a block schematic diagram of a telecine apparatus using switchable band limiting filters, and FIG. 2 is a block schematic diagram of a telecine apparatus embodying the invention and which avoids the use of switchable filters.

FIG. 1 is a schematic diagram of a system using switchable band limiting filters which it is the object of the present invention to avoid. The system comprises a crystal oscillator 1, which may or may not be synchronised to the studio sync generator 29, whose output drives two frequency dividers 2 and 3 respectively which determine the ratio between the two line scanning frequencies at which the system is designed to operate. A switch 31 selects one or other of the dividers to drive a horizontal counter 4 according to the line frequency desired. The counter 4 acts to generate a line synchronising pulse after each n pulses received from the switch 31, the line synchronising pulses driving a horizontal scan generator 6 which produces a horizontal sawtooth deflection current. This horizontal deflection current, whose frequency is equal to that of the line synchronising pulses from counter 4, is applied to the deflector 8 of a flying spot cathode ray tube 9 in order to provide the horizontal deflection of the flying spot in conventional manner. Since the number n is fixed, the horizontal or line frequency of the flying spot is directly proportional to the division ratio of the particular divider 2 or 3 selected by switch 31.

The vertical deflection of the flying spot is controlled by a vertical sawtooth deflection current applied to the deflector 8 and generated by a vertical scan generator 7, the latter being driven by vertical synchronising pulses from a vertical counter 5. The arrangement is similar to the corresponding components of the horizontal deflection arrangement, except that as it is not required to change the vertical frequency with a change in the horizontal frequency the vertical counter 5 is at all times driven by only one of the dividers 2 and 3, in the present case divider 2, and the vertical synchronising pulses provided by the counter 5 are generated after each m pulses of the divider 2 (m>n) so as to provide the desired vertical frequency of the flying spot. Furthermore, the amplitude of the vertical deflection current is adjustable in accordance with the height (or part thereof) of each film frame to be reproduced and the chosen line frequency.

The horizontal and vertical deflection currents supplied to the deflector 8 cause the flying spot to trace out a raster line-by-line on the screen of the cathode ray tube 9 in the usual way. An objective lens 10 produces an image of the c.r.t. raster on a film 11 which is driven frame-by-frame with continuous motion past a scanning station by a transport mechanism not shown. The raster focussed on the film 11 effects line-by-line scanning of each film frame during its motion through the scanning station.

Photocells 12 produce three colour value signals red (R), blue (B) and green (G) which are then processed in conventional manner in a video channel 13 to provide a luminance signal Y and two colour difference signals R-Y and B-Y. Each signal Y, R-Y and B-Y is an analogue electrical signal which comprises, in respect of each film frame, a plurality of lines of which at least a part of each (referred to herein as the active part) contains picture information by virtue of the modulation of the flying spot by the film picture. The particular proportion of each analogue line constituting the active part and the position of the latter within the line will depend upon the horizontal scan amplitude and the horizontal position of the raster image relative to the film respectively. Some lines may be produced having no active part, by virtue of the flying spot scanning the film bar between adjacent picture frames. However, such lines are rejected by the further processing to be described and will not be considered further.

The conversion of the R, G and B signals to Y, R-Y and B-Y signals is not strictly necessary, but if the R, G and B signals were used in the further processing to be described three channels would be required to obtain the full luminance bandwidth. By using Y, R-Y and B-Y signals where Y occupies one channel and R-Y, B-Y the other channel the cost of one store and one analogue to digital converter is saved, as will be seen.

The processed signals from 13 pass via respective selector switches 32, 33 and 34 to respective band pass filters 14 or 15, 16 or 17 and 18 or 19, depending upon the positions of the switches 32 to 34. The selected positions of these switches 32 to 34 are in turn dependent upon the position of the switch 31 (i.e. upon the selected line frequency of scanning) so that the appropriate band pass filter is connected in circuit in each case. A switch 35 passes the Y signal to an analogue-to-digital (A/D) converter 21, and switches 36 and 37 pass the R-Y and B-Y signals via a multiplex switch 38 to an A/D converter 20. The A/D converters 20 and 21 sample the analogue signals Y and R-Y/B-Y at a clock frequency determined by the output signal of the switch 31 which serves as a clock pulse source for the converters. Thus the clock frequency used is directly proportional to the chosen line scanning frequency, so that for a given horizontal scan amplitude (which is assumed to be constant in the system of FIG. 1) the active part of each analogue line is sampled the same number of times in respect of either line scanning frequency.

The digital signals from 20 and 21 next pass into respective digital picture stores 23 and 22 under the control of store control logic 28. Information supplied to the control logic 28 from the horizontal and vertical counters 4 and 5 respectively determines when in the vertical and horizontal cycles the digital signals are written into the stores, so as to exclude the storage of signals resulting from scanning parts of the film outside the picture frame and, if desired, signals resulting from scanning parts of the picture frame which it is not desired to reproduce. The stores 22 and 23 serve to convert the digital signals from sequential to interlaced form and for this purpose information supplied to the control logic 28 from the studio sync generator 29 determines the sequence and rate of reading out of the signals. A digital-to-analoge (D/A) converter 24 converts the Y signal to analogue form and a switch 39 demultiplexes the R-Y and B-Y signals to feed respective D/A converters 25 and 26. Finally, the analogue signals Y, R-Y and B-Y in interlaced form are encoded in conventional manner by a colour encoder 27.

FIG. 2 is a schematic diagram of an embodiment of the invention which is a modification of the system described above and which is designed to eliminate the use of switchable band limiting filters. Many of the components of the FIG. 2 system are the same as those in the FIG. 1 system and are similarly referenced. Thus a full description of FIG. 2 will not be given, and only the differences between the systems will be discussed in detail.

In the system of FIG. 2 the counters or dividers 2 and 3 have been removed so that the A/D converters 20 and 21 now receive constant frequency clock pulses. This removes the necessity for switchable band limiting filters, and thus filters 15, 17 and 19 have been omitted together with the associated selector switches 32 to 37. The horizontal counter 4 of FIG. 1 has been changed to a programmable counter 4A in FIG. 2. The programming permits the number n (referred to above in relation to counter 4) to be selectively varied in accordance with the desired line scanning frequency. Thus increasing n reduces the line frequency and vice versa. The number n should be capable of assuming either one of at least two values so as to provide at least two different line scanning frequencies as in the FIG. 1 system.

If the line scanning frequency were changed while maintaining a constant horizontal scan amplitude, the number of clock pulses corresponding to or occurring during the active part of each analogue line would be inversely proportional to the line frequency. This would mean that the horizontal resolution in the reproduced picture would be dependent upon the line scanning frequency and furthermore the capacity of the picture stores 22 and 23 would not be fully utilised except in respect of the lowest line scanning frequency which can be chosen.

To avoid this it is necessary to control (automatically or by manual control) the horizontal deflection speed of the flying spot in such manner that for any chosen line frequency the time taken to derive the active part of each analogue line corresponds to the same number of clock signals in each case. The simplest way of achieving this is to change the horizontal scan amplitude of the flying spot (i.e. the rate of increase of the horizontal sawtooth deflection current) in inverse proportion to the change in line scanning frequency.

Assume for example that at a given line scanning frequency F and horizontal scan amplitude A the cycle period is 48 $\mu$s of which 38 $\mu$s represents the actual picture scan (active part). If the line frequency is now decreased by one quarter (to $\frac{3}{4}$F) so as to have a cycle period of 64 $\mu$s, the amplitude of the horizontal scan should be increased by one third (to 4/3A) so that the actual picture scan is still represented by 38 $\mu$s of the 64 $\mu$s cycle period. Thus in each case the active part of each line is 38 $\mu$s in duration and is sampled by the same number of clock pulses.

Thus the programmable counter 4A is adapted to supply to the scan generator 6 not only the horizontal synchronising pulses as before, but also to provide information defining the correct horizontal scan amplitude for any selected line scanning frequency according to the above relationship. The programmable counter 4A also provides changing information to the store control logic 28 in accordance with changes in the selected line scanning frequency, to ensure that the correct portion of each line of digital signal is written into the stores 22 and 23 in each case.

What is claimed is:

1. In a continuous motion flying spot telecine apparatus comprising means for transporting a film frame-by frame with continuous motion past a scanning station, means for effecting flying spot line-by-line scanning of each film frame during its motion through the scanning station, opto-electronic converter and signal processing means for producing from the scanning of each film frame an analogue signal comprising a plurality of lines of which at least a part of each (the active part) contains picture information, filter means for limiting the bandwidth of the analogue signal, an analogue-to-digital converter for sampling the analogue signal at a predetermined clock frequency, a store for storing digital signals produced by the sampling, and means for reading out the stored digital signals in a predetermined sequence and at a predetermined rate, the improvement comprising means for selectively changing the line frequency of scanning between at least two values without changing the clock frequency, and means for controlling the horizontal deflection speed of the flying spot in such manner that for either line scanning frequency the time taken to derive the active part of each line of the analogue signal corresponds to the same number of clock signals in each case.

2. An apparatus as claimed in claim 1, where the means for controlling the horizontal deflection speed of the flying spot comprises means for changing the horizontal scan amplitude of the flying spot in inverse proportion to the change in line scanning frequency.

3. An apparatus as claimed in claim 1 or 2, wherein the opto-electronic converter and signal processing means comprises means for providing a plurality of analogue signals containing different picture information, each analogue signal being sampled at the same clock frequency and being provided with a respective filter means, analogue-to-digital converter, and store.

4. An apparatus as claimed in claim 3, wherein two analogue signals are provided which are respectively a luminance signal and a signal which comprises two different colour difference signals multiplexed together.

5. An apparatus as claimed in claim 1 or claim 2, wherein the line scanning frequency is defined by a counter which generates a line synchronising signal after each n pulses generated by an oscillator, and wherein the number n is selectively variable so as to change the line scanning frequency.

6. An apparatus as claimed in claim 5, wherein the pulses generated by the oscillator, or pulses derived therefrom, are used as the clock pulses.

* * * * *